United States Patent
Dean

(10) Patent No.: US 9,640,828 B2
(45) Date of Patent: May 2, 2017

(54) FUEL CELL STACK ASSEMBLY

(71) Applicant: LG Fuel Cell Systems Inc., North Canton, OH (US)

(72) Inventor: Eric Dean, Mickleover (GB)

(73) Assignee: LG Fuel Cell Systems Inc., North Canton, OH (US)

(*) Notice: Subject to any disclaimer, the term of this patent is extended or adjusted under 35 U.S.C. 154(b) by 104 days.

(21) Appl. No.: 14/801,646

(22) Filed: Jul. 16, 2015

(65) Prior Publication Data
US 2016/0141705 A1    May 19, 2016

(30) Foreign Application Priority Data
Nov. 17, 2014    (GB) .................................. 1420380.6

(51) Int. Cl.
| | |
|---|---|
| H01M 2/38 | (2006.01) |
| H01M 8/2485 | (2016.01) |
| H01M 8/243 | (2016.01) |
| H01M 8/00 | (2016.01) |
| H01M 8/124 | (2016.01) |

(52) U.S. Cl.
CPC ......... *H01M 8/2485* (2013.01); *H01M 8/004* (2013.01); *H01M 8/243* (2013.01); *H01M 2008/1293* (2013.01)

(58) Field of Classification Search
CPC ......... H01M 2008/1293; H01M 8/004; H01M 8/243; H01M 8/2485
See application file for complete search history.

(56) References Cited

U.S. PATENT DOCUMENTS

| | | |
|---|---|---|
| 2008/0038622 A1 | 2/2008 | Valensa et al. |
| 2014/0272666 A1 | 9/2014 | Goettler et al. |

FOREIGN PATENT DOCUMENTS

| | | | |
|---|---|---|---|
| EP | 1419547 B1 | 4/2008 | |
| EP | 2221908 A1 | 8/2010 | |
| EP | 2728657 A | 5/2014 | |
| JP | 04237963 A | 8/1992 | |
| JP | 2005166470 A | 6/2005 | |
| KR | 20140100041 A | 8/2014 | |
| KR | 1020140100041 | * 9/2014 | .............. H01M 8/12 |

OTHER PUBLICATIONS

International Search Report and Written Opinion from counterpart PCT Application No. PCT/GB2015/053446, dated Jan. 22, 2016, 12 pp.
Search and Examination Report from counterpart GB Application No. GB1420380.6, dated Sep. 15, 2015, 6 pp.

* cited by examiner

*Primary Examiner* — Patrick Ryan
*Assistant Examiner* — Ben Lewis
(74) *Attorney, Agent, or Firm* — Shumaker & Sieffert, P.A.

(57) ABSTRACT

There is provided a fuel cell stack assembly being thermally and mechanically compliant. The fuel cell stack comprises fuel feed pipe and fuel outlet pipe, a plurality of bundles of fuel cell tube sub-assemblies, the bundles being separated by an expansion gap to prevent thermal and mechanical stresses propagating from one bundle to an adjacent bundle.

11 Claims, 9 Drawing Sheets

FUEL CELL STACK ASSEMBLY

CROSS REFERENCE TO RELATED APPLICATION

This application claims priority to GB Application No. 1420380.6, filed Nov. 17, 2014, which is incorporated by reference herein in its entirety.

There is disclosed a fuel cell stack assembly. In particular, there is disclosed a fuel cell stack assembly that is thermally and mechanically compliant.

BACKGROUND

Certain fuel cell stack assemblies have to operate at high temperatures. One example of a high temperature fuel cell assembly is a solid oxide fuel cell assembly. Currently the main variants of the solid oxide fuel cell are the tubular solid oxide fuel cell (T-SOFC), the planar solid oxide fuel cell (P-SOFC) and the monolithic solid oxide fuel cell (M-SOFC).

The tubular solid oxide fuel cell comprises a tubular solid oxide electrolyte member which has inner and outer electrodes. Typically the inner electrode is the cathode and the outer electrode is the anode. An oxidant gas is supplied to the cathode in the interior of the tubular solid oxide electrolyte member and a fuel gas is supplied to the anode on the exterior surface of the tubular solid oxide electrolyte member. (This arrangement may be reversed). The tubular solid oxide fuel cell allows a simple cell stacking arrangement and is substantially devoid of seals. However, the fabrication of this type of solid oxide fuel cell is very sophisticated, manpower intensive and costly. Also this type of solid oxide fuel cell has a relatively low power density due to long current conduction paths through the relatively large diameter tubular cells.

The monolithic solid oxide fuel cell has two variants. The first variant has a planar solid oxide electrolyte member which has electrodes on its two major surfaces. The second variant has a corrugated solid oxide electrolyte member which has electrodes on its two major surfaces. The monolithic solid oxide fuel cell is amenable to the more simple tape casting and calendar rolling fabrication processes and promises higher power densities. This type of solid oxide fuel cell requires the co-sintering of all the fuel cell layers in the monolith from their green states. However, this results in serious shrinkage and cracking problems. This type of solid oxide fuel cell is not so easy to manifold and seal.

The planar solid oxide fuel cell is also amenable to tape casting and calendar rolling fabrication processes. Currently it requires thick, 150-200 microns, self-supported solid oxide electrolyte members which limit performance. The planar solid oxide fuel cell also has limited thermal shock resistance.

Solid oxide fuel cells require operating temperatures of around 700 to around 1000° C. to achieve the required electrolyte performance within the active fuel cells.

The operating temperature of a solid oxide fuel cell assembly is in principle high enough for steam reforming of a hydrocarbon fuel internally of the solid oxide fuel cell stack. Internal steam reforming would simplify the balance of plant of a solid oxide fuel cell assembly (or solid oxide fuel cell stack) and improve operating efficiency. However, reforming of a hydrocarbon fuel within the solid oxide fuel cell stack has a number of problems which have not been overcome. Full internal reforming of the hydrocarbon fuel in solid oxide fuel cell stacks is precluded by the strongly endothermic nature of the steam reforming reaction, and consequential thermal shocking of the delicate fuel cells. Internal reforming on nickel cermet anodes in solid oxide fuel cells tends to catalyse carbon formation.

Embodiments of the present invention seek to provide a novel fuel cell assembly having good thermal and mechanical compliance during cold start up to normal operating temperatures.

EP0668622B1 discloses a solid oxide fuel cell which comprises a plurality of modules. Some of these modules comprise hollow members, which have two parallel flat surfaces upon which the solid oxide fuel cells are arranged. The opposite ends of each module are connected to reactant manifolds by compliant bellow connections.

However, such an arrangement does not provide sufficient thermal and mechanical compliance in the solid oxide fuel cell stack to minimise the mechanical and thermal stresses in the solid oxide fuel cell stack.

EP1419547B1 discloses a solid oxide fuel cell stack, which comprises a plurality of modules, the modules comprising elongate hollow members, the hollow members having a passage for flow of reactant. The modules are arranged so that at least one end of each module is connected to an end of an adjacent module to allow reactant to flow sequentially through the modules in a serpentine type arrangement.

However, the arrangement only provides thermal and mechanical compliance within a bundle and does not prevent thermal and mechanical stresses building up across adjacent bundles. Furthermore, the arrangement does not address issues with fuel distribution from fuel cell tubes throughout a stack.

BRIEF SUMMARY

According to a first aspect, there is provided a fuel cell assembly comprising at least one fuel cell strip, each strip comprising:
 a fuel feed pipe;
 a fuel outlet pipe; and
 a plurality of bundles, each bundle comprising a plurality of tube sub-assemblies, each tube sub-assembly comprising a fuel cell tube, the tube sub-assemblies being separated longitudinally by end fittings connecting adjacent tube sub-assemblies, the end fittings provide a passage for fuel;
 wherein one of a respective lowermost or uppermost tube sub-assembly of each bundle comprises a manifold end fitting connecting the bundle to the fuel feed pipe and the other of the respective lowermost or uppermost tube sub-assembly of each bundle comprises a manifold end fitting connecting the bundle to the fuel outlet pipe; and
 wherein adjacent manifold end fittings from adjacent bundles are separated by an expansion gap.

The advantage of this arrangement of manifold end fittings being separated by an expansion gap is that thermal and mechanical stresses in each bundle propagate from each bundle to the fuel feed pipe and the fuel outlet pipe and do not propagate from bundle to adjacent bundle. A mechanical load path is created by the combination of end fittings and the fuel inlet pipe and fuel outlet pipe such that mechanical loads within the stack propagate along the end fittings of each bundle (and not through the more delicate fuel cell tubes). The expansion gap between adjacent bundles provides mechanical load isolation between adjacent bundles and, as such, any mechanical stresses in the bundle are directed toward the fuel inlet pipe and the fuel outlet pipe.

Furthermore, the expansion gap between adjacent bundles accommodates thermal expansion of the bundles without creating additional mechanical loads on the strip architecture.

Optionally, the manifold end fittings may be connected to manifold end fittings of adjacent bundles, via a section of the fuel feed pipe and a section of the fuel outlet pipe.

The fuel feed pipe and fuel outlet pipe are formed in sections, such that the combination of sections of the fuel feed pipe and sections of the fuel outlet pipe forms a strip fuel feed pipe and a strip fuel outlet pipe. The fuel outlet pipe and the fuel feed pipe are typically stronger than the tube sub-assemblies, and therefore more able to withstand thermal and mechanical stresses in the fuel cell strip. The arrangement therefore supports a mechanical load path through the end fittings of the tube sub-assemblies and towards the fuel feed pipe and fuel outlet pipe.

Optionally, the expansion gap between adjacent bundles may be configured to provide a clearance between adjacent bundles to accommodate thermal expansion of the bundles.

The expansion gap between adjacent bundles provides sufficient clearance such that temperature differentials within the fuel cell strip that cause the bundles to expand and contract do not adversely affect the overall structure of the strip.

Optionally, the fuel feed pipe and fuel outlet pipe may be constrained within a fuel cell stack.

Constraining the fuel feed pipe and fuel outlet pipe in this manner improves stack integrity during transportation.

Optionally, the arrangement of fuel feed pipe and fuel outlet pipe connected to the bundle may constrain movement of the tube sub-assemblies within the bundle.

Optionally, a coefficient of thermal expansion (CTE) of the end fittings may be matched to a CTE of the fuel cell tubes.

Matching the CTE of the end fittings to the CTE of the fuel cell tubes reduces relative expansion and contraction of the end fittings and fuel cell tubes.

Optionally, a coefficient of thermal expansion (CTE) of the fuel feed pipe and the fuel outlet pipe may be matched to a CTE of the end fittings.

This is particularly important during start-up of the fuel cell stack, when inlet and outlet fuel temperatures may differ.

Optionally, the first end fitting and the second end fitting are made from impervious magnesia magnesium aluminate (MMA) ceramic material.

MMA ceramic materials are particularly suitable for components because MMA may be formed using known techniques such as injection moulding. MMA ceramic materials are also able to withstand the high temperatures experienced within the fuel cell.

Optionally, the fuel feed pipe and the fuel outlet pipe may be made from dense impervious ceramic material.

The dense impervious ceramic material is able to withstand larger mechanical stresses than the fuel cell module ceramic material, and therefore the fuel feed pipe and the fuel outlet pipe are able to withstand the mechanical load throughout the strip.

Optionally, the end fittings may be provided with alignment features configured to couple with adjacent end fittings, facilitating alignment between adjacent end fittings.

Providing alignment features on the end fittings enables easier build of the bundles and the fuel cell strip.

Optionally, the end fittings may comprise a ledge for supporting fuel cell tubes, the ledge being configured to provide a gap between the fuel cell tubes of one tube sub-assembly and the fuel cell tubes of an adjacent tube sub-assembly.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having increments of integer multiples of 100.

A fuel cell stack assembly is an assembly of at least one fuel cell stack.

Figure 1:
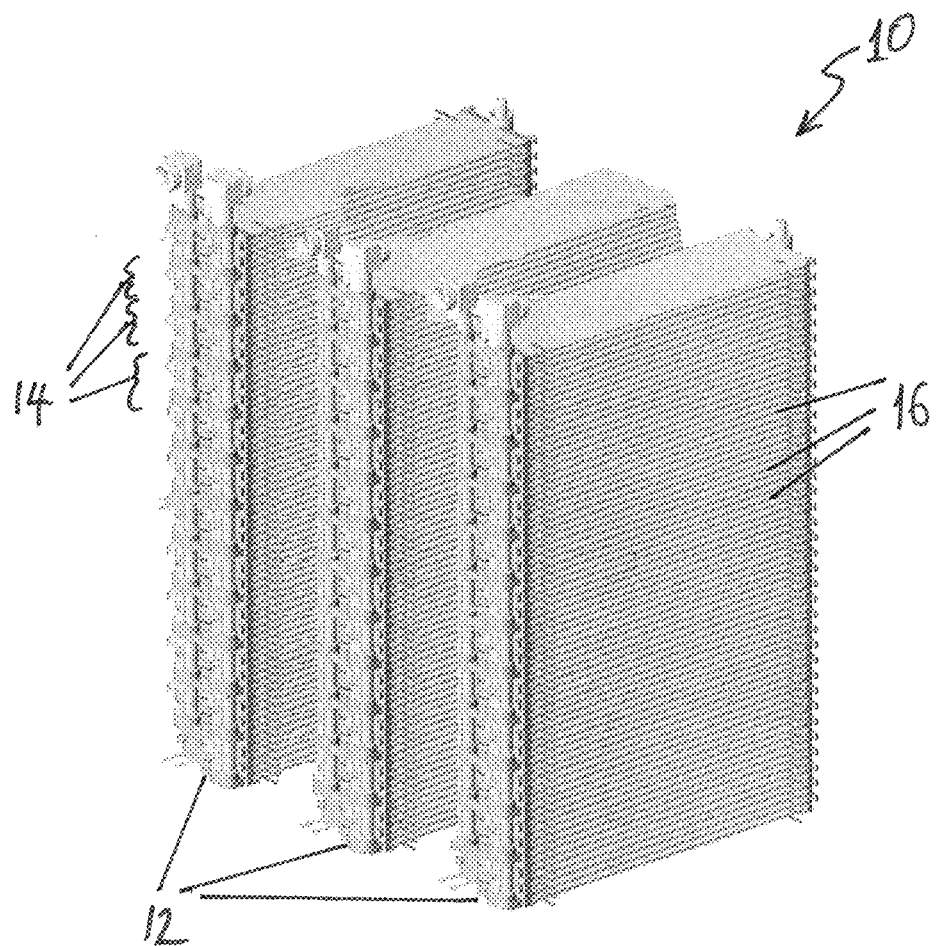
FIG. 1 is a fuel cell stack.
Figure 2:
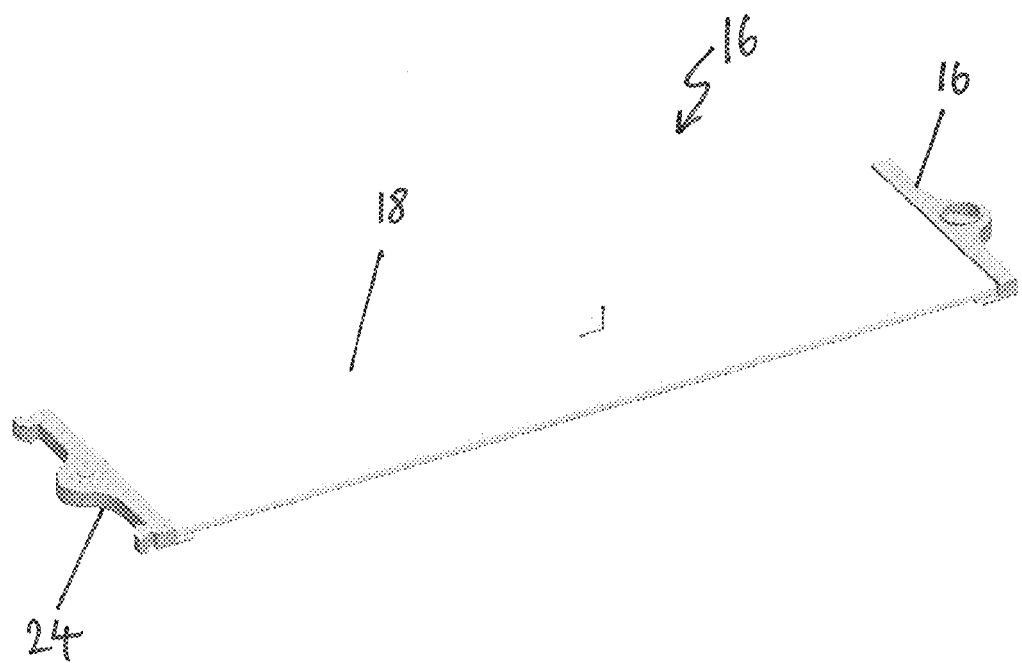
FIG. 2 is a tube sub-assembly.
Figure 3:
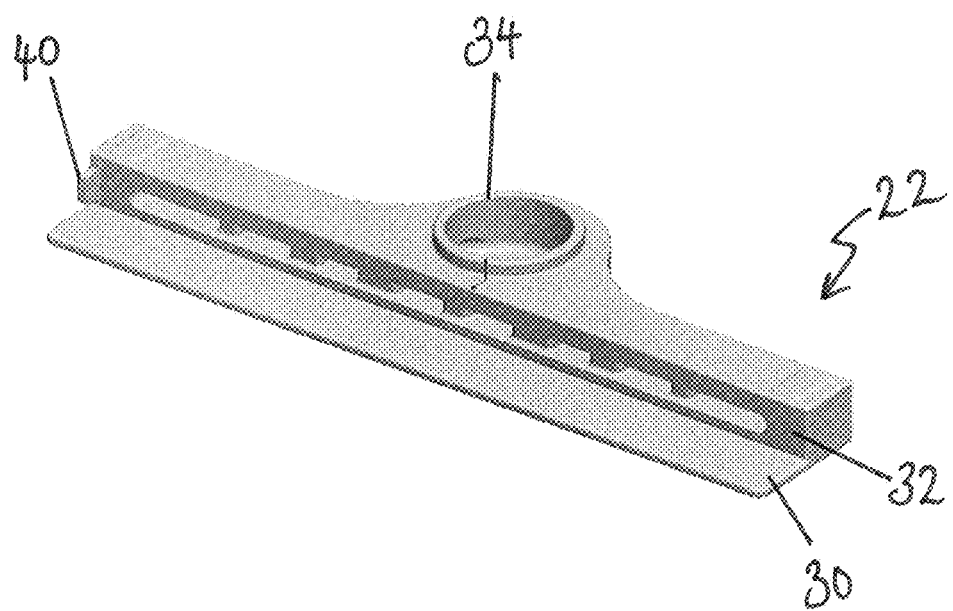
FIG. 3 is an end fitting.
Figure 4:
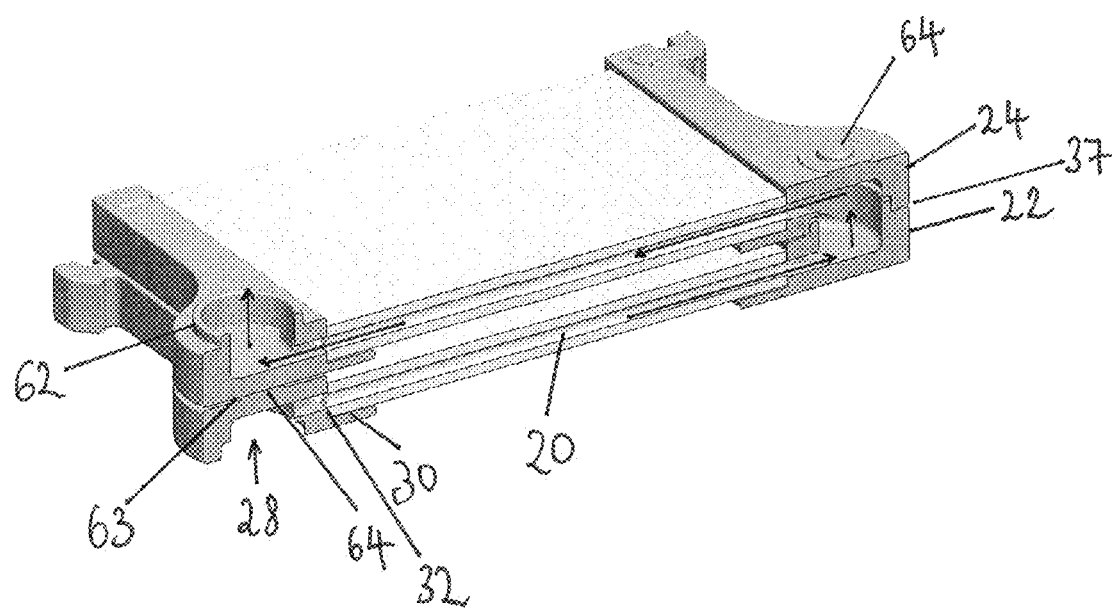
FIG. 4 illustrates the fuel flow path through tube sub-assemblies.

The solid oxide fuel cell stack 10 comprises at least one fuel cell strip 12, each strip 12 comprises a plurality of bundles 14, and the bundles 14 are arranged substantially parallel to each other as shown in FIG. 1. Each bundle 14 comprises a plurality of tube sub-assemblies 16, and each tube sub-assembly 16 comprises a fuel cell tube 18 incorporating a plurality of fuel cells. FIG. 2 shows a tube sub-assembly 16, FIG. 3 shows an end fitting 22, and FIG. 4 shows the fuel flow path through tube sub-assemblies. The fuel cell tube 18 has at least one passage 20 extending longitudinally through the fuel cell tube 18 for flow of reactant.

The fuel cell tubes 18 are porous magnesia magnesium aluminate (MMA) tubes and are shown for simplicity, without fuel cells. The tube sub-assembly includes a fuel cell tube 18 and impervious MMA end fittings 22, 24 on each end of the fuel cell tubes. FIG. 3 shows an MMA end fitting 22.

The tubes are arranged on the end fittings 22, 24 such that each tube sub-assembly comprises an end fitting 22, 24 at opposing ends. The fuel cell tube is supported by the L-shaped end fittings 22, 24. The end fittings have a first sealing face 30 and second sealing face 32 for mounting fuel cell tubes 18 onto the end fittings. The first sealing faces and second sealing faces are substantially perpendicular and the first sealing face defines a ledge 30 for the surface close to the end of the fuel cell tube to adhere to the end fitting. The second sealing faces define the surface to which the end of the fuel cell tube adheres. The connection between the second sealing face and the end of the fuel cell tube forms a gas tight flow path 28 between the fuel cell tube 18 and the end fitting 22, 24. The fuel cell tubes and end fittings are sealed with ceramic glass paste or other fixing means.

The end fittings are made from an impervious material such as an MMA ceramic material. Any material being impervious, capable of withstanding the operating temperatures of the fuel cell stack and with a coefficient of thermal expansion matched to the CTE of the fuel cell tubes is suitable for producing the end fittings. Furthermore, the impervious end fittings are able to bear larger compressional loads when compared with the fuel cell tubes.

The end fittings are produced via an injection moulding process. Injection moulding is a widely utilised manufacturing process for producing parts using precision-machined moulds to form geometrically accurate parts. Alternatively, the end fittings may also be produced using press moulding. Press moulding or a pressing process provides similarly geometrically accurate parts as required by embodiments of the present invention.

Several types of end fitting are required to produce a fuel cell bundle. A first type end fitting 22 is shown in FIG. 3. A second type end fitting 24 is shown in FIG. 4 (coupled to first type end fitting 22). A first and second type end fitting couple together as shown in FIG. 4 and the complete end fittings connect one end of a first tube sub-assembly with an end of an adjacent tube sub-assembly to form a serpentine flow path through the bundle of tube sub-assemblies.

Adjacent tube sub-assemblies 16 are arranged substantially parallel to one another in a bundle 14 and the tube sub-assemblies are spaced apart such that the fuel cell tube 18 of one fuel cell tube sub-assembly 16 does not touch the fuel cell tube 18 of an adjacent tube sub-assembly 16.

The spacing between the fuel cell tubes 18 is created to allow oxidant to flow between the tubes during operation.

The gap between adjacent tubes 18 is created by the end caps 22 and 24 of the tube sub-assemblies 16 as they are stacked on top of each other. The tube sub-assembly 16 is connected to an adjacent tube sub-assembly via an end fitting 22, 24. The benefits of using end fittings in combination with the fuel cell tubes to make a tube sub-assembly 16 are numerous and include minimising the number of parts required when constructing the fuel cell strip 12. As such, the tube sub-assembly 16 is a single part. Constructing the stack in a modular manner negates the need for complex fuel cell tube sealing procedures.

The alignment features 64, 34 are provided on each end fitting to reduce compounding manufacturing tolerances.

Alignment features include a location pin 64 to provide positive alignment for the non-bonded coupling 63 of the end fitting of one tube sub-assembly to the adjacent tube sub-assembly. Non-bonded couplings improve thermal compliance of the fuel cell strip since small variations in thermal expansion are accommodated by the non-bonded couplings. The non-bonded couplings help to accommodate thermal expansion of the bundle from start-up at room temperature to the operating temperature of the fuel cell stack. It is especially important to accommodate thermal tolerance close to the main strip feed pipe as a greater temperature gradient exists close to the main strip feed pipe. Furthermore, mechanical stresses due to fuel pressure contribute to additional mechanical stresses experienced near to or in the region of the main strip feed pipes. Manufacturing tolerances are also accommodated within the non-bonded coupling.

The inlet fuel pipe and the outlet fuel pipe are made from an impervious ceramic MMA material with a CTE matched to adjoining components to minimise thermal stresses.

Each end fitting includes a bonded joint 37, 62 and a non-bonded coupling 63. The gas tight joints (bonded joints) are formed using glass ceramic tape cast gaskets. The bonded joint 37, 62 provides a flow path for fuel between coupled end fittings and creates a gas tight seal using a glass ceramic material or similar. The non-bonded coupling is located on the opposite face of the end fitting and is either provided with a location pin 64 or a location socket 63. The location pin 64 and location socket 63 of adjacent end fittings couple together to form a non-bonded coupling.

The location pin 64 is cylindrical. A cylindrical location pin 64 is arranged to couple with a slot 62 to provide latitudinal confinement between adjacent tube sub-assemblies while allowing limited longitudinal motion between adjacent tube sub-assemblies. Other shapes of location pins are also envisaged enabling the motion between adjacent sub-assemblies to be constrained in one direction and allow a small amount of motion in another direction.

The end fittings are manufactured from a material where the coefficient of thermal expansion (CTE) of the end fitting is matched to the CTE of the fuel cell tubes. Solid oxide fuel cells require operating temperatures of around 700° C. to around 1000° C. to achieve the required electrolyte performance within the active fuel cells; during cold start-up for example, large temperature variations can cause large expansion and contraction of components and a mismatch in the CTE can have adverse consequences to the mechanical and thermal integrity of the stack 10. Some variation in temperature is found throughout the stack and throughout the tube sub-assemblies even at normal operating temperatures. Therefore, by matching the CTE of the end fittings with the CTE of the fuel cell tubes, mechanical stresses induced by thermal variation of the tubes and end fittings are reduced.

Figure 5:
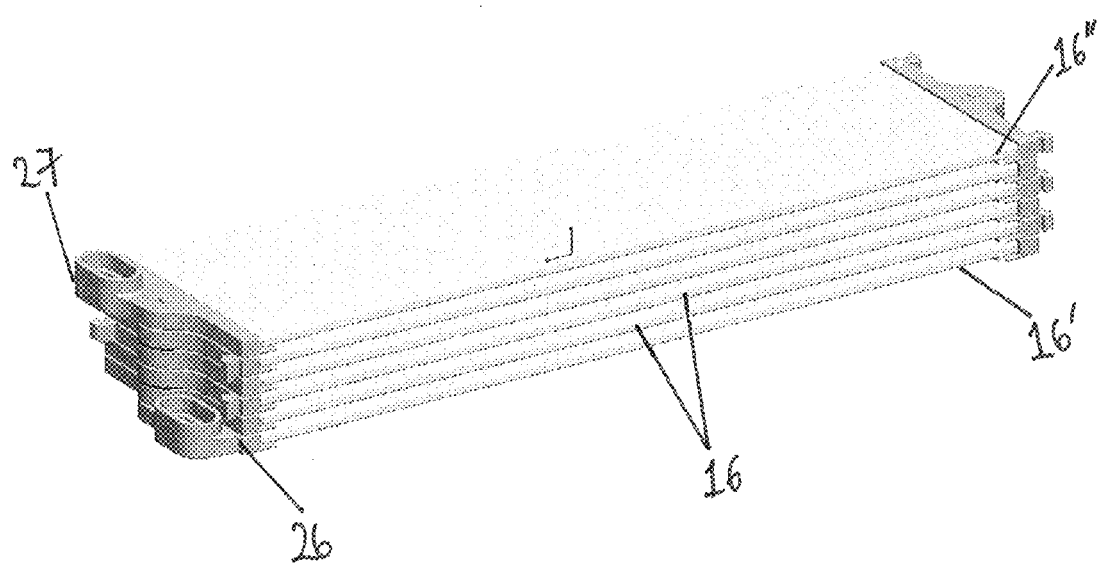
FIG. 5 is a fuel cell bundle with an inset showing the fuel pipe.

As described above, several types of end fitting are required in order to build a fuel cell stack, strip or bundle in a modular manner. For example, a bundle as shown in FIG. 5 may comprise two, four, six or more tube sub-assemblies.

In a preferred embodiment, six tube sub-assemblies are stacked on top each other to form a bundle.

In a bundle, the uppermost tube sub-assembly 16" and lowermost tube sub-assembly 16' are provided with means for connecting the bundle to the fuel inlet pipe 133 and fuel outlet pipe 135 via manifold end fittings 26, 27. The bundle has means for reactant inlet and reactant outlet from the lowermost 16' to the uppermost 16" tube sub-assemblies, and therefore through the bundle 14. The manifold end fittings on the terminating ends of the lowermost 16' and uppermost 16" tube sub-assemblies have means for connecting to the fuel inlet pipe portion 133 and fuel outlet pipe portion 135 respectively, that form the fuel feed pipe and fuel outlet pipe.

The fuel inlet pipe portion 133 and fuel outlet pipe portion 135 includes a pillar 155 which is provided to strengthen the pipe portion and to improve fuel flow. The bundle connects to the main strip fuel feed pipe and fuel outlet pipe via portions 133, 135 which connect to the fuel manifold end fittings 26, 27 via glass ceramic tape cast sealing gaskets. The portions are provided with sleeves 154, 157 and flanges 153, 156. The sleeves are provided with an alignment feature 152 to improve alignment of the portion 133, 135 with the manifold end fittings 26, 27.

Figure 6:
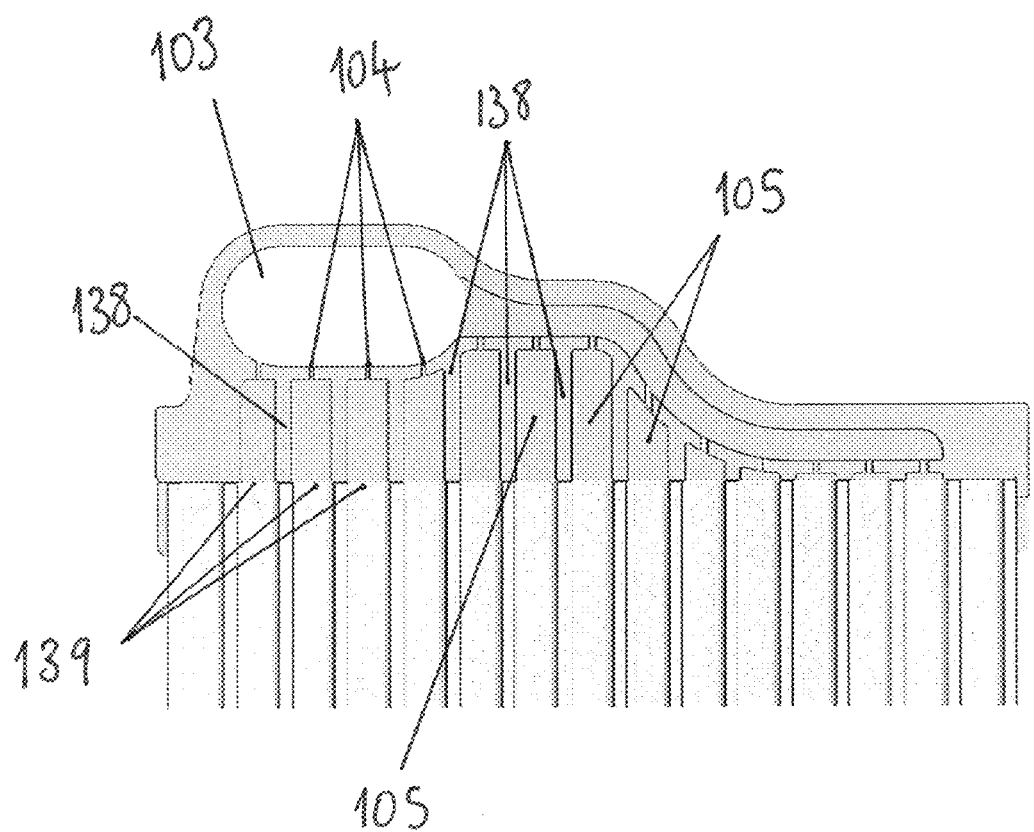
FIG. 6 is a manifold end fitting.

The manifold end fittings are provided with a socket 158 and a flange 159 to connect to the portions 133, 135 as shown in FIG. 6. The socket and flange provide a mechanical pathway for mechanical and thermal stresses within the bundle to propagate from the end fittings of the bundle to the fuel pipe. The benefit of providing a mechanical pathway from the bundle to the fuel manifold end fitting and to the fuel pipe is that mechanical and thermal stresses propagate through the fuel pipe and do not propagate from one bundle to an adjacent bundle. The diversion of thermal and mechanical stress increases the durability of the relatively more fragile fuel cell tubes and there increases the life span of the fuel cell stack.

The fuel inlet pipe and the fuel outlet pipe may also be arranged in an alternative configuration wherein the manifold end fittings on the terminating ends of the uppermost 16" and lowermost 16' tube sub-assemblies have means for connecting to the fuel inlet pipe portion 133 and fuel outlet pipe portion 135 respectively. The fuel inlet pipe portion, fuel outlet pipe portion and the manifold end fittings connect together to form the strip fuel pipes.

FIG. 6 illustrates a perspective and section view of an inlet manifold end fitting 26; similar design features are also present on outlet manifold end fittings 27 (not shown). The fuel connector 103 is arranged to connect the fuel pipe portions 133, 135 either to the fuel flow path 102, or connect the fuel pipe directly to the apertures 104. The fuel connector is provided with a socket 158 and flange 159 as described above, and also a slot 152 for the alignment feature 152 of the fuel pipe portion to sit in. The pillars (or webs) 138 provide differing channel 105 with lengths depending on the channels proximity to the fuel connector and thus the main inlet fuel pipe. This arrangement is designed provides a constant fuel flow to each fuel cell channel 139. Fuel feed orifices 104 within the inlet manifold end fitting are individually sized to achieve a desired pressure drop from the inlet fuel pipe and within the flow path 102 to achieve the required flow distribution in conjunction with the orifices 104.

The manifold end fittings include features (webs and channels 138,139, apertures 104, 105, and internal fuel plenum 102) that improve fuel flow distribution throughout the bundles, while also providing thermal and mechanical compliance of the bundles in the strip as described below.

Figure 7:
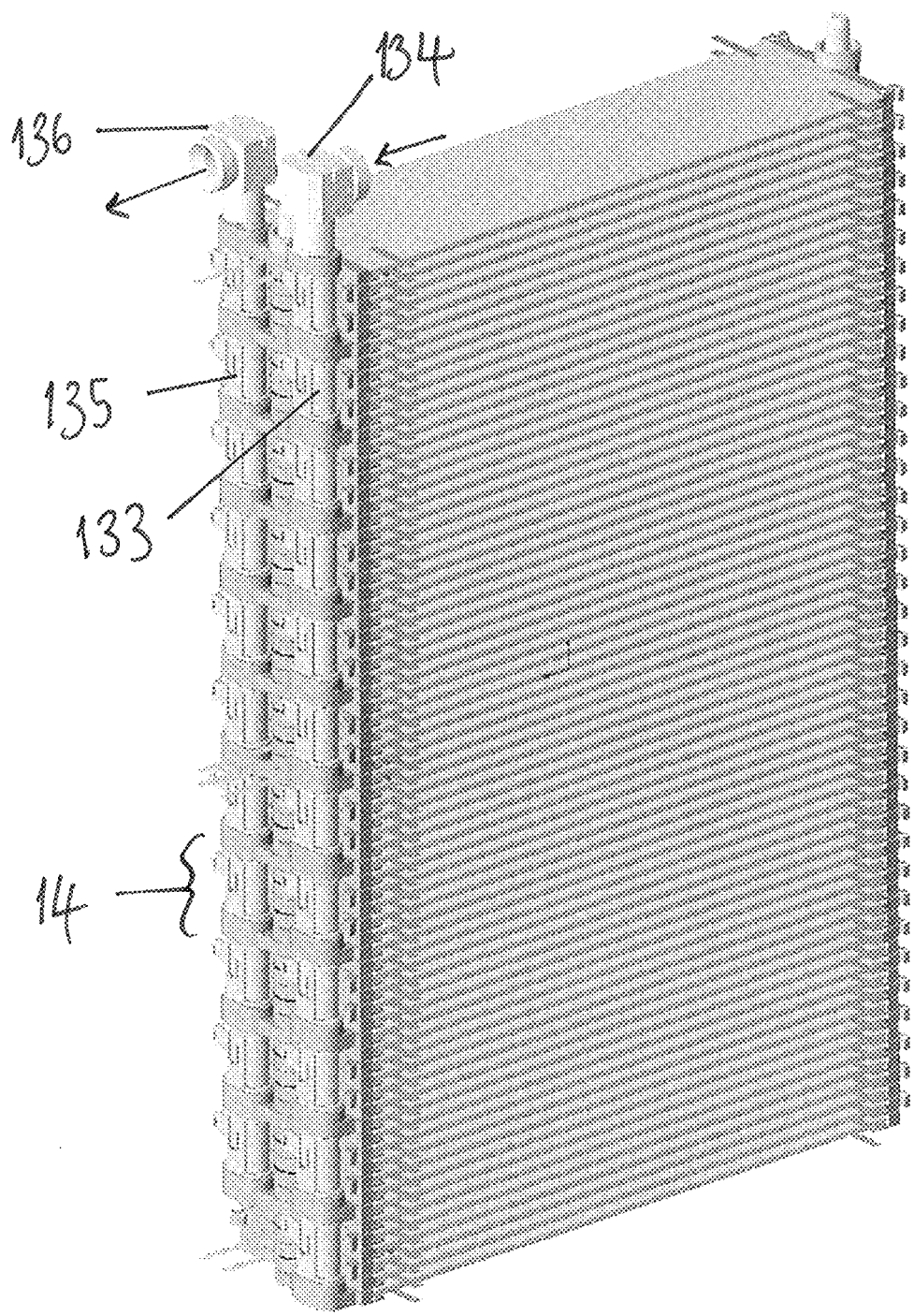
FIG. 7 is fuel cell strip.

FIG. 7 shows the strip assembly including twelve bundles 14 connected to a plurality of fuel inlet pipe portions 133 and a plurality of fuel outlet pipe portions 135 to form the main strip fuel pipes. The inlet fuel pipe (formed by portions 133) and outlet fuel pipe (formed by portions 135) are connected to the main strip fuel exit 136, main strip fuel feed 134. The manifold end fittings connect together via the inlet fuel pipe portions 133 and fuel outlet pipe portions 135. The manifold end fittings provide a gas tight flow path for reactant to flow from the end fitting to the first end of the tube sub-assembly.

This arrangement provides a simple design. The bundles are fed through a main strip inlet fuel pipe and fuel exits the bundles via a main strip outlet fuel pipe.

The fuel inlet pipe and fuel outlet pipe are constrained to reduce movement of tube sub-assemblies within the strip. However, the non-bonded joints within the bundles allow for some horizontal motion between neighbouring tube sub-assemblies, and accommodate manufacturing tolerances.

A combination of non-bonded couplings 142 and bonded joints 144 between adjacent end fittings provides further mechanical and thermal compliance within the bundle and strip. The non-bonded couplings 142 permit horizontal and/or longitudinal relative movement between adjacent tube sub-assemblies, while the bonded joints 144 maintain the gas tight flow path for fuel throughout the tube sub-assemblies and fuel cell tubes.

The reactant manifold has at least one flange and at least one socket for connecting to a fuel pipe portions. The flange and socket are arranged such that when adjacent bundles are stacked together, an expansion gap 140 exists between two adjacent bundles, as shown in FIG. 8.

The expansion gap 140 provides clearance between adjacent bundles. The expansion gap 140 therefore provides the necessary clearance to accommodate thermal expansion variation due to the temperature differential between the inlet fuel pipe, the outlet fuel pipe and the fuel cell tubes within the tube sub-assemblies and the bundles.

Figure 8:
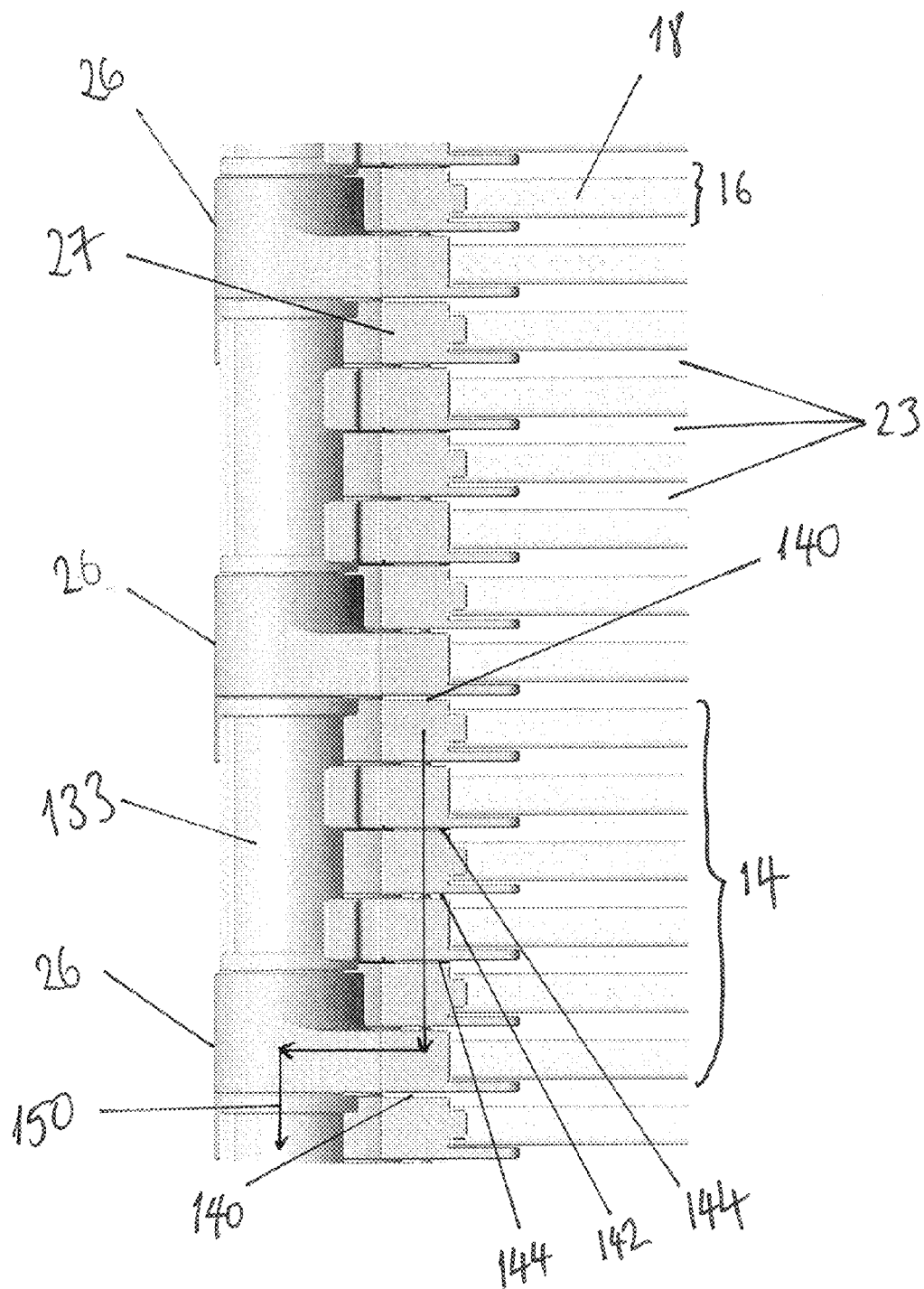
FIG. 8 is a section of a fuel cell strip showing the main mechanical load path.

FIG. 8 shows a section of the strip assembly and the manifold end fitting 26 and shows the preferred mechanical load path 150 for mechanical stress propagation within the strip. In order to provide an arrangement whereby mechanical stresses are prevented from building up within the fuel cell tubes, and passing from one bundle to an adjacent bundle, the manifold end fittings are separated by an expansion gap 140.

The expansion gap 140 is formed using a removable spacer that is positioned between the inlet manifold and the outlet manifold when the bundles are stacked together. After the strip is sintered (and all bonded joints between end fittings secured) the spacer between the manifold end fittings is removed leaving a gap that prevents mechanical loads within one bundle from propagating to an adjacent bundle and hence throughout the entire strip of bundles.

The mechanical load path 150 is indicated on FIG. 8 by arrows. Mechanical stresses within each bundle propagate through the end fittings and not through the more fragile fuel cell tubes since the gap 23 prevents fuel cell tubes of adjacent tube sub-assemblies from touching one another. The manifold end fittings 26, 27 provide a mechanical load path away from the tube sub-assemblies 16 and the fuel cell tubes 18, towards the fuel pipes 133, 134. The ceramic fuel pipes 133, 134 are stronger than the fuel cell tubes and are able to absorb additional mechanical stresses without degradation or damage. The manifold end fittings 26, 27 connect to the fuel pipe via a gas tight joint.

Figure 9:
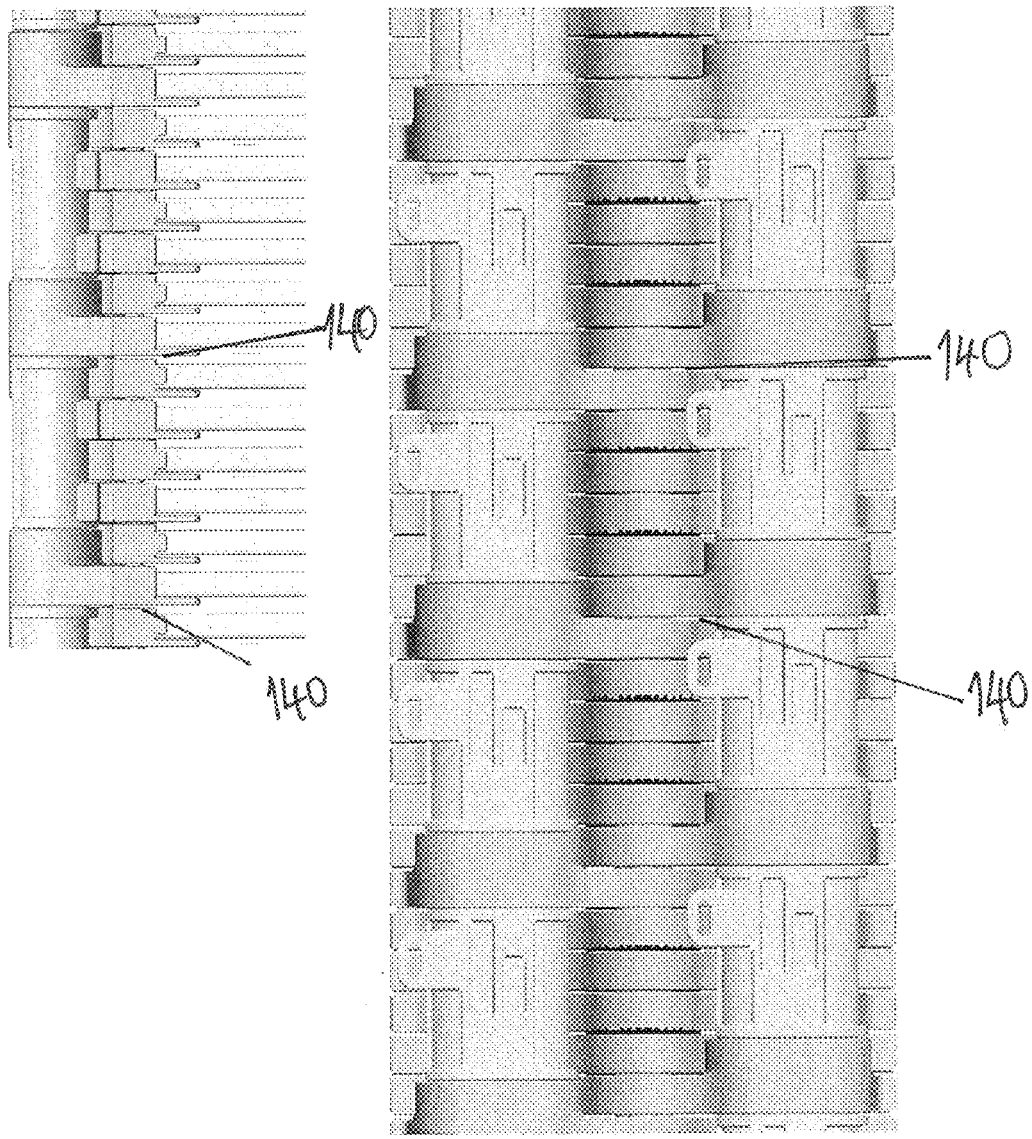
FIG. 9 shows a section of a fuel cell strip showing the expansion gap between adjacent bundles.

FIG. 9 illustrates how thermal compliance within the fuel cell strip is achieved. The expansion gap 140 between adjacent bundles 14 provides clearance to accommodate thermal expansion variation due to the temperature differential between fuel inlet and exit flows and fuel cell tubes within the bundles.

In certain examples, the end fittings are provided with alignment features configured to couple with adjacent end fittings. The alignment features facilitate alignment between adjacent end fittings while accommodating thermal and mechanical stresses. The alignment features further facilitate alignment between adjacent end fittings while accommodating manufacturing tolerance between the adjacent end fittings.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A fuel cell stack comprising at least one fuel cell strip, each strip comprising:
　a fuel feed pipe;
　a fuel outlet pipe; and
　a plurality of bundles, each bundle comprising a plurality of tube sub-assemblies, each tube sub-assembly comprising a fuel cell tube, the tube sub-assemblies being separated longitudinally by end fittings connecting adjacent tube sub-assemblies, the end fittings providing a passage for fuel;
　wherein one of a respective lowermost or uppermost tube sub-assembly of each bundle comprises a manifold end fitting connecting the bundle to the fuel feed pipe and the other of the respective lowermost or uppermost tube sub-assembly of each bundle comprises a manifold end fitting connecting the bundle to the fuel outlet pipe; and
　wherein adjacent manifold end fittings from adjacent bundles are separated by an expansion gap.

2. The fuel cell stack as claimed in claim 1, wherein the manifold end fittings are connected to manifold end fittings of adjacent bundles via a section of the fuel feed pipe and a section of the fuel outlet pipe.

3. The fuel cell stack as claimed in claim 1, wherein the expansion gap between adjacent bundles is configured to provide a clearance between adjacent bundles to accommodate thermal expansion of the bundles.

4. The fuel cell stack as claimed in claim 1, wherein the fuel feed pipe and fuel outlet pipe are constrained within a stack block.

5. The fuel cell stack as claimed in claim 1, wherein the arrangement of fuel feed pipe and fuel outlet pipe connected to the bundle constrains movement of the tube sub-assemblies within the bundle.

6. The fuel cell stack as claimed in claim 1, wherein a coefficient of thermal expansion (CTE) of the end fittings is matched to a CTE of the fuel cell tube.

7. The fuel cell stack as claimed in claim 1, wherein a CTE of the fuel feed pipe and the fuel outlet pipe is matched to a CTE of the end fittings.

8. The fuel cell stack as claimed in claim 1, wherein the end fittings comprise magnesia magnesium aluminate (MMA) ceramic material.

9. The fuel cell stack as claimed in claim 1, wherein the fuel feed pipe and the fuel outlet pipe comprise magnesia magnesium aluminate (MMA) ceramic material.

10. The fuel cell stack as claimed in claim 1, wherein the end fittings are provided with alignment features configured to couple with adjacent end fittings, facilitating alignment between adjacent end fittings.

11. The fuel cell stack as claimed in claim 1, wherein the end fittings comprise a ledge for supporting the fuel cell tube, the ledge being configured to provide a gap between the fuel cell tube of one tube sub-assembly and the fuel cell tube of an adjacent tube sub-assembly.

* * * * *